US005576739A

United States Patent [19]

Murphy

[11] Patent Number: 5,576,739

[45] Date of Patent: Nov. 19, 1996

[54] CARBON MONOXIDE SAFETY SYSTEM

[75] Inventor: Richard F. Murphy, Oaklawn, Ill.

[73] Assignee: Phy-Con. Inc., Oak Lawn, Ill.

[21] Appl. No.: 295,519

[22] Filed: Aug. 24, 1994

Related U.S. Application Data

[63] Continuation-in-part of Ser. No. 900,325, Jun. 18, 1992, abandoned.

[51] Int. Cl.[6] ........................ G05B 23/02; G08B 17/10; F27D 21/04

[52] U.S. Cl. ........................ 340/825.06; 340/632; 432/37

[58] Field of Search ........................ 340/825.06, 527, 340/578, 632, 633, 634; 73/23.34, 31.01, 31.02, 31.03; 432/36, 37; 200/61.03; 431/76

[56] References Cited

U.S. PATENT DOCUMENTS

| | | | |
|---|---|---|---|
| 3,609,732 | 9/1971 | Kasahara et al. | 340/634 |
| 3,733,595 | 5/1973 | Benedict | 340/527 |
| 3,826,180 | 7/1974 | Hayashi | 340/634 |
| 3,909,816 | 9/1975 | Teeters | 340/578 |
| 3,997,837 | 12/1976 | Betz et al. | 340/634 |
| 4,197,675 | 4/1980 | Kelly | 340/634 |
| 4,360,801 | 11/1982 | Duhame | 340/632 |
| 4,514,729 | 4/1985 | Szarka | 340/825.06 |
| 4,529,980 | 7/1985 | Liotine et al. | 340/825.52 |
| 4,567,557 | 1/1986 | Burns | 340/825.06 |
| 4,665,385 | 5/1987 | Henderson | 340/632 |
| 4,819,551 | 4/1989 | Vole | 340/632 |
| 5,239,980 | 8/1993 | Hilt et al. | |

OTHER PUBLICATIONS

"Coal Miners may get a firealarm they can trust"; *Business Week* Jul. 16, 1990; p. 167.

"How to prevent this Silent Killer from Invading Your Home"; *The Family Handyman*; Jan. 1992; pp. 50–55.

Product Brochure; "GHD2001 Carbon Monoxide Gas–Alarm"; PAMA Electronics Ltd; Israel; undated.

Diller; "The Availablity of $CO_2$ Detectors"; J.A.M.A. vol. 266 No. 23 p. 3286; Dec. 18, 1991.

E. M. Dolnick et al.; "Carbon Monoxide Safety Shutoff: Meeting the AGA Requirements"; IEEE Transactions on Industry Applications; vol. 24, No. 6, Nov./Dec. 1988.

*Primary Examiner*—Alyssa H. Bowler
*Assistant Examiner*—Mark H. Rinehart
*Attorney, Agent, or Firm*—Gildo E. Fato

[57] ABSTRACT

Described is a system for measuring noxious gas concentration in an affected space and for controlling the device producing the noxious gas or for decreasing the concentration of the gas in the affected space. The invention is particularly described in relation to measuring carbon monoxide concentration in an automobile garage and for controlling the garage door opener circuit to open the garage door in response to a preselected concentration of carbon monoxide. Also described in particular is a system for deactivating a furnace operating circuit to turn off the furnace in the event of excessive carbon monoxide concentration.

1 Claim, 3 Drawing Sheets

CARBON MONOXIDE SAFETY SYSTEM

This is a continuation-in-part of application Ser. No. 07/900,325, filed Jun. 18, 1992, now abandoned.

BACKGROUND OF THE INVENTION

The possibility of carbon monoxide poisoning is a serious safety hazard. Carbon monoxide accounts for one half the fatal poisoning in the United States each year, from a minimum of about 200 to as many as 1500. Carbon monoxide is a serious hazard because of its strong attraction to hemoglobin which normally combines with oxygen in the lungs and carries it throughout the body. When carbon monoxide is present, it replaces the oxygen and, in high enough concentration, poisoning can result.

Carbon monoxide is a by-product of incomplete combustion. Since it is odorless and colorless, there is no warning of its presence. Carbon monoxide sources include automobile exhaust fumes, furnaces, kitchen gas ranges, water heaters, fireplaces, charcoal grills, and small gasoline engine operated equipment. Moreover, with the current concern for energy efficiency, many recently built homes do not provide adequate fresh air flow. Homes are tighter because of more insulation, caulking, insulating window films and weather stripping. If there is inadequate fresh air flow, the opportunity arises for carbon monoxide build-up. Carbon monoxide poisoning is more of a problem during the winter because heating systems are running.

To minimize the possibility of carbon monoxide becoming a problem, one should exercise care and not sit in a parked car with the engine running and the windows closed or let the engine idle for a long period of time in a closed garage. Never use a kitchen stove or oven for heating purposes, never use LP gas lamps, heaters or gasoline lanterns indoors or in a recreational vehicle unless they are vented to the outside, etc. It is also important to have all heating equipment checked periodically for proper function and to be sure they are vented properly.

While precautions can be taken to minimize the possibility of carbon monoxide poisoning, accidental leaks do occur, so it is advisable to utilize carbon monoxide detectors. Chemical detectors are available which are the least expensive but require monitoring. These use carbon monoxide sensitive chemicals which change color when exposed to a specified level of the gas. An example In the Quantum Eye® Carbon Monoxide Detector available from the Quantum Group, Inc., San Diego Calif.

Electronic detectors are more expensive but do not need to be monitored as they sound an alarm when specified levels of carbon monoxide are present. An example is the Ultralert® combination gas detector available from BDC Electronics, Inc., Midland, Tex.

While electronic detectors are effective in warning occupants of a home or business of the danger of excessive carbon monoxide, they can be ineffective, for example, if the home in unoccupied or if the occupants are asleep and do not hear the alarm. Another danger is an automobile occupant inadvertently closing the garage door and falling asleep while the motor runs. Accordingly, a device which would automatically shut down a furnace or other heating equipment or open a garage door upon the carbon monoxide concentration reaching a specified level would be desirable.

SUMMARY OF THE INVENTION

In accordance with the principals of the present invention there is provided a system for detecting undesirable levels of carbon monoxide gas and in response thereto, activating the appropriate electrical circuit to thereby shut down a furnace, open a garage door or ventilation damper, or activate an exhaust fan, or the like, to terminate the production of carbon monoxide gas or decrease the concentration of the gas in the affected space.

The system comprises a carbon monoxide detector positioned in the circuit for controlling the device producing the carbon monoxide or for decreasing the concentration of the gas in the affected space. The carbon monoxide detector includes normally open or normally closed electrical contacts, depending upon whether it is to activate or deactivate an electrical circuit in response to detection of an undesirable concentration of carbon monoxide gas. For example, in a system for measuring carbon monoxide concentration in an automobile garage and for controlling the garage door opener circuit to thereby open the garage door in response to a high gas concentration, the carbon monoxide detector will include normally open electrical contacts. The electrical contacts are thus arranged to close when the carbon monoxide detector senses the specified gas concentration to thereby activate the garage door open circuit and open the garage door. For use with a furnace, the system utilizes a carbon monoxide detector with normally closed contacts so that the furnace will operate normally in response to the need for heat. When the detector senses an undesirable concentration of carbon monoxide, the contacts are arranged to open, thereby interrupting the electric power to the furnace to shut it down.

Thus the present invention is effective to automatically stop the production of carbon monoxide or decrease the concentration of the gas in an affected area.

BRIEF DESCRIPTION OF THE DRAWINGS

The invention will be better understood from the following description in conjunction with the accompanying drawings, in which.

DETAILED DESCRIPTION OF THE INVENTION

For ease of reference, the invention will be described with reference to a system for automatically opening a garage door or turning off a furnace in the event of a high concentration of carbon monoxide, but it is recognized that the invention can be used to automatically activate an exhaust or ventilation system, open a skylight, etc.

Figure 2:
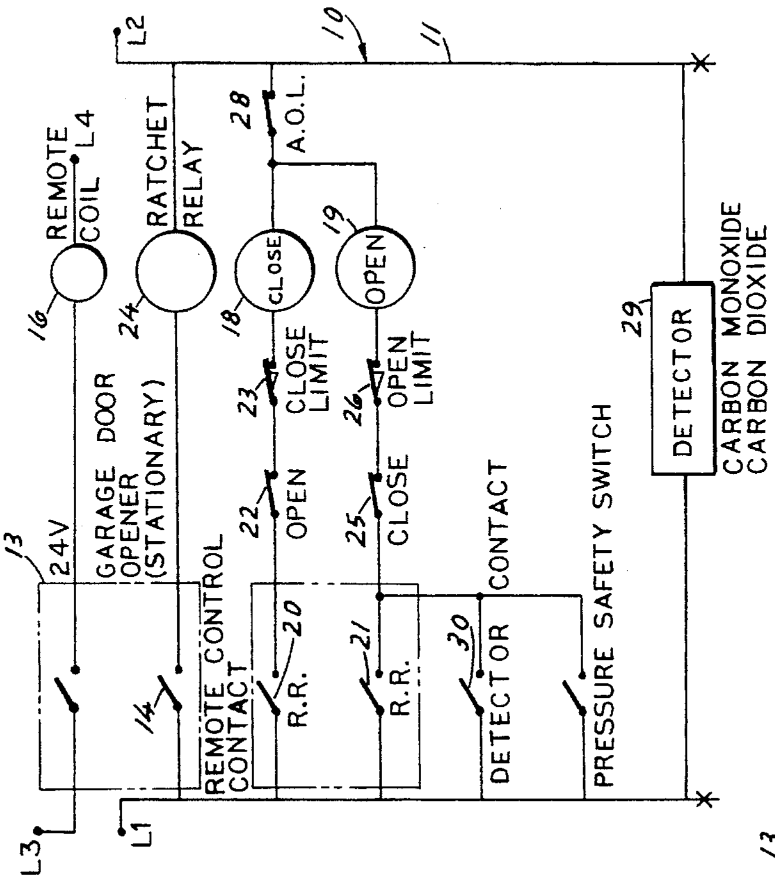
FIG. 2 illustrates a system for use with an original garage door opener installation.
Figure 1:
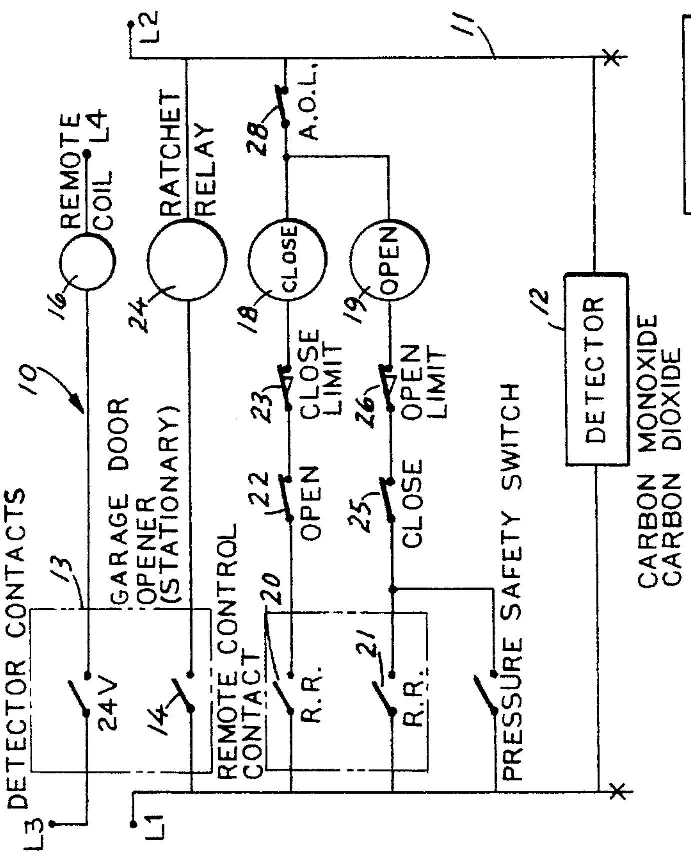
FIG. 1 illustrates a system for use with an existing garage door opener arrangement.
Figure 3:
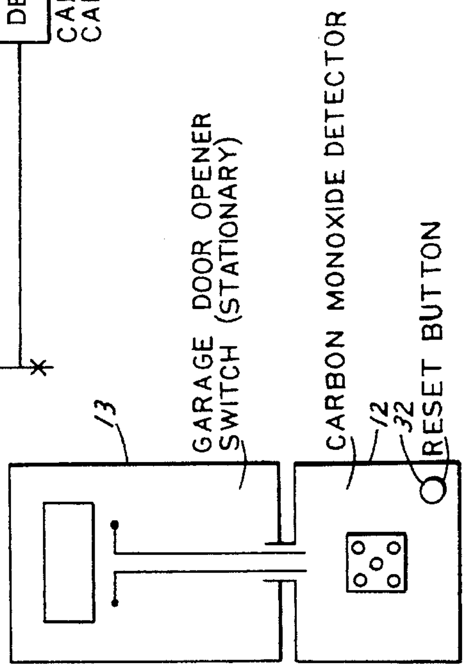
FIG. 3 illustrates placement of the carbon monoxide detector in conjunction with a garage door opener manual switch.

Referring to FIGS. 1–3, there is illustrated a system 10 for use with a garage door opener circuit 11, either an existing unit (FIG. 1) or a new installation, (FIG. 2). FIG. 1 illustrates a system 10 for use with an existing garage door opener circuit 11. In normal use, the position of the garage door, either opened or closed, is controlled by a stationary garage opener switch 13 or by a remote control contact 14 by means of a remote coil 16. The door opener circuit 11 include normally "close" branch 18 and normally "open" branch. Each include a set of contacts 20,21 from relay 24. When the garage door is closed, the switch 22 in the "close" circuit 18 is open. The close limit switch 23 controls the closed position of the garage door. At the same time, in the opening circuit 19, the close switch 25 is open. The open limit switch 26 controls the open position of the garage door and prevents the door from opening too far. To open the closed door, the stationary garage door opener switch 13 is depressed to close the switch contacts (not. shown) or the remote control contact 14 is closed by depressing the switch on the remote control unit (not shown) which energizes the remote coil 16. Remote coil 16 power source $L_3$, $L_4$ is a 24 volt control circuit. When the switch 13 or remote control contact 14 is closed, the relay 20 is energized, which in turn energizes the "open" circuit branch 19 so that the current passes from the relay 20 through the close switch 25, the open limit switch 26, and through the all over load switch 28 to complete the circuit 19 thereby opening the door.

The carbon monoxide detector 12 is placed in the garage door opener circuit 11 and preferably is installed at the bottom of the stationary garage door opener control 13, as illustrated in FIG. 3, mounted at about five feet above the finish floor to insure proper metering. The carbon monoxide detector is preferably calibrated relatively low (200–400 ppm) so as to detect the presence of carbon monoxide before any occupants of the garage or other building are aware of it.

Other calibrations can be used. For example, the detector can be calibrated to respond when the concentration of carbon monoxide in the air is 50 ppm for six hours, 200 ppm for one-half hour or 400 ppm at any time.

FIGS. 1 and 2 illustrate a system for an existing garage door opener arrangement. For installation in an existing garage door opener, the detector 12 can be placed next to the garage door opener switch 13 with the wires from the carbon monoxide detector 12 connected to the stationary garage door opener switch 13 by means of quick connect wire crimps as illustrated in FIG. 2. With this system, the carbon monoxide detector 12 contacts 30 are normally open. When the detector 12 senses the presence of a high level of carbon monoxide, the detector contacts close, which allows current to pass through the relay 20. Energizing the relay 20 in turn energizes the "open" circuit branch 19, as previously described, to complete the circuit 19 and open the door. As illustrated in FIG. 3, the carbon monoxide detector 12 includes a reset control 32 so that once the open circuit 19 is activated by means of the detector 12 sensing a high level of carbon monoxide to open the door, the door cannot be closed by means of the garage door opener switch 13 or the remote control unit (not shown). Thus, if an automobile is allowed to run inside a closed garage, the door will open when the detector 12 senses a high level of carbon monoxide and it cannot be closed without first resetting the reset control 32. This will prevent the door from being closed prematurely, before the carbon monoxide gas has been dissipated, particularly by use of a remote control unit. Hence, the system 10 will automatically open a residence or automobile service garage door in the event the carbon monoxide concentration reaches an unsafe level.

FIG. 2 illustrates a system for a newly installed garage door opener. Here, the carbon monoxide detector 29 is placed in the garage door "open" or opening circuit portion 19 of the garage door controlling circuit 11. As with the existing garage door controlling circuit, the carbon monoxide detector 29 contacts 30 are normally open. When the detector senses a preselected concentration of carbon monoxide, the detector contacts 30 close allowing current to energize the "open" or opening circuit branch 19 as previously described, thereby opening the garage door.

Figure 5:
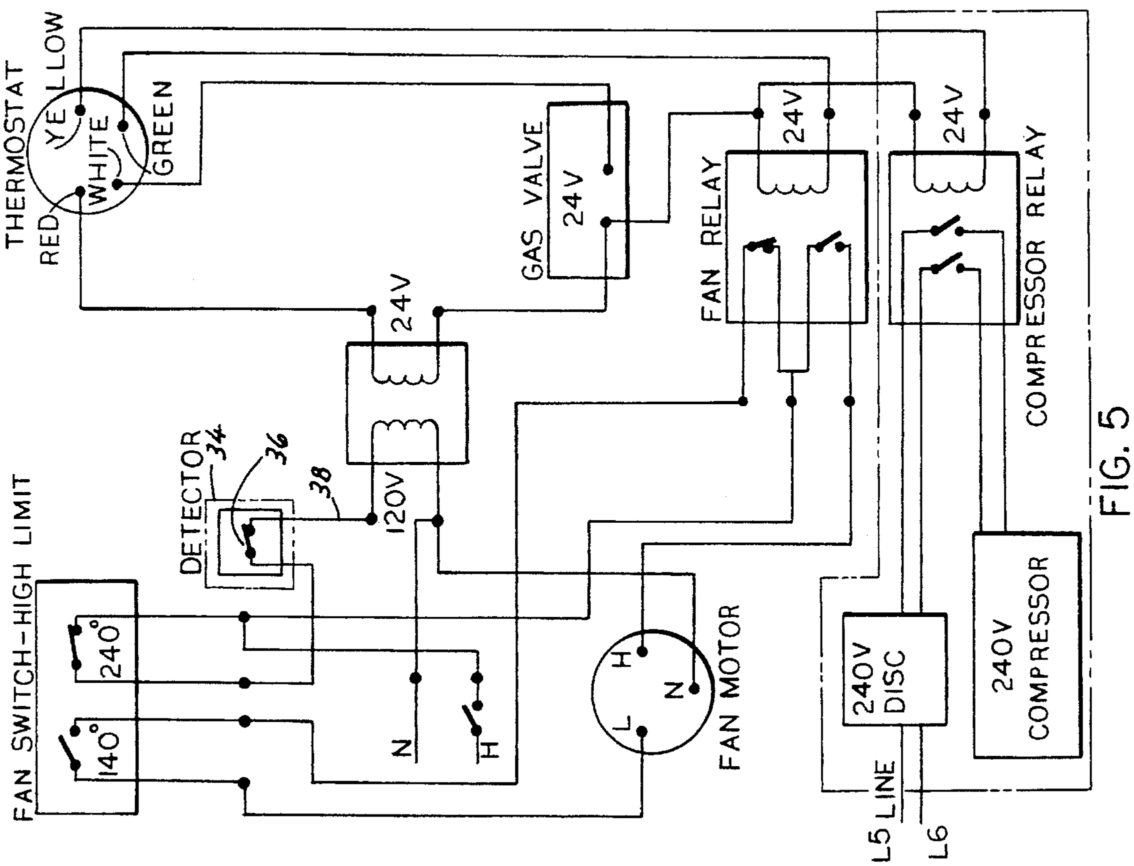
FIG. 5 illustrates a system for use with an original furnace installation.
Figure 4:
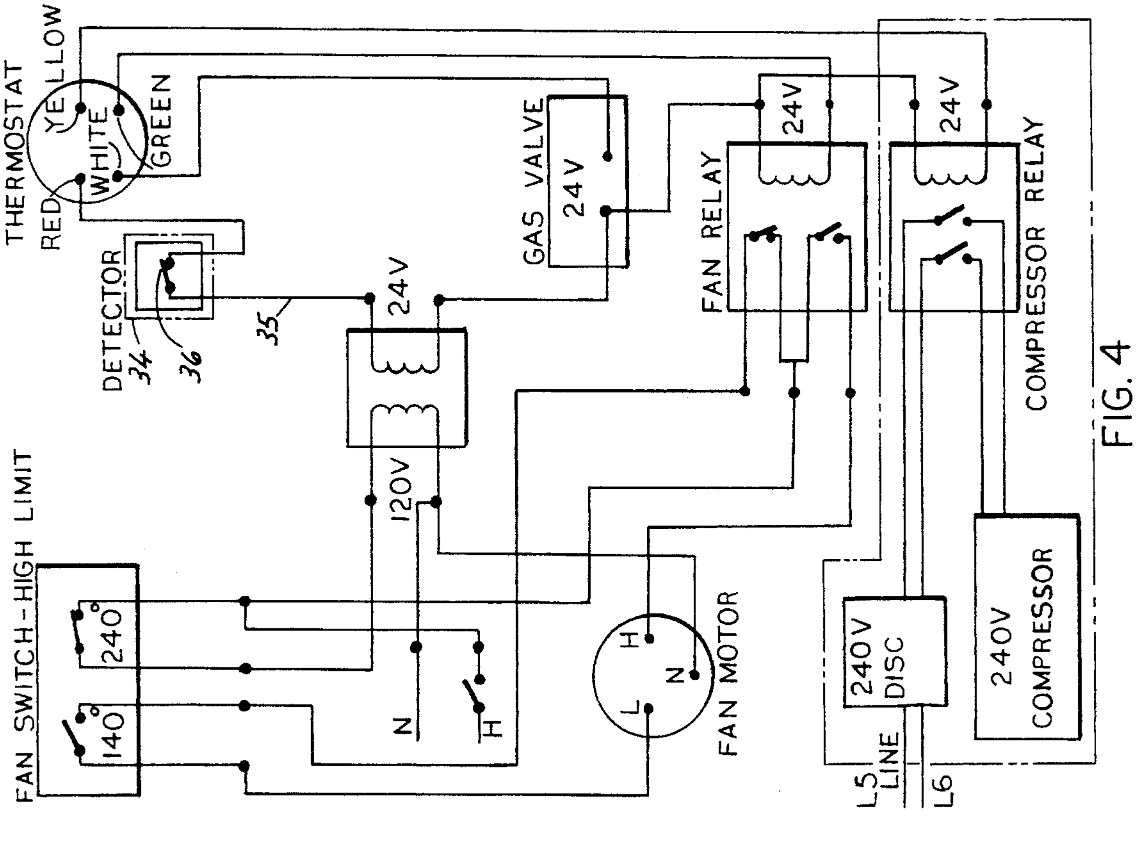
FIG. 4 illustrates a system for use with an existing furnace arrangement.

FIGS. 4 and 5 illustrate a system for use with a furnace. FIG. 4 illustrates an existing furnace and air conditioning system. For convenience, the carbon monoxide detector 34 in positioned in the thermostat circuit 35 which is 24 volt rated and easier for the individual homeowner to work with. The detector contacts 36 are normally closed so that the thermostat circuit 35 is complete and the furnace can operate. In the event the carbon monoxide concentration reaches the specified level, the detector contacts 36 will open interrupting the thermostat circuit 35 and the furnace will shut down. An optional air conditioning system is shown, operated by a 240 volt power source, $L_5$, $L_6$, generally located outside the building.

FIG. 5 illustrates a system for an original furnace installation. Here the carbon monoxide detector 34 is placed directly in the 120 volt rate transformer circuit 38 so that responsive to the specified concentration of carbon monoxide gas, the detector contacts 36 will open, thereby interrupting the power source to the furnace which will stop operating so that the generation of carbon monoxide gas will stop.

In similar fashion, the invention can be utilized to activate a ventilation system, deactivate a water heater, and the like, all responsive to the detection of a preselected level of carbon monoxide in proximity to the dater heater, etc. Injury from other noxious gases can likewise be minimized by use of the present invention.

If desired, the carbon monoxide detector and circuit controller 12, 29 can be made with both a circuit including normally open contact and one with normally closed contacts. The unit can then be used to activate an electrical circuit such as for a garage door open, which requires normally open contacts, or deactivate an electrical circuit, such as for a furnace, which requires normally closed contacts.

Figure 6:
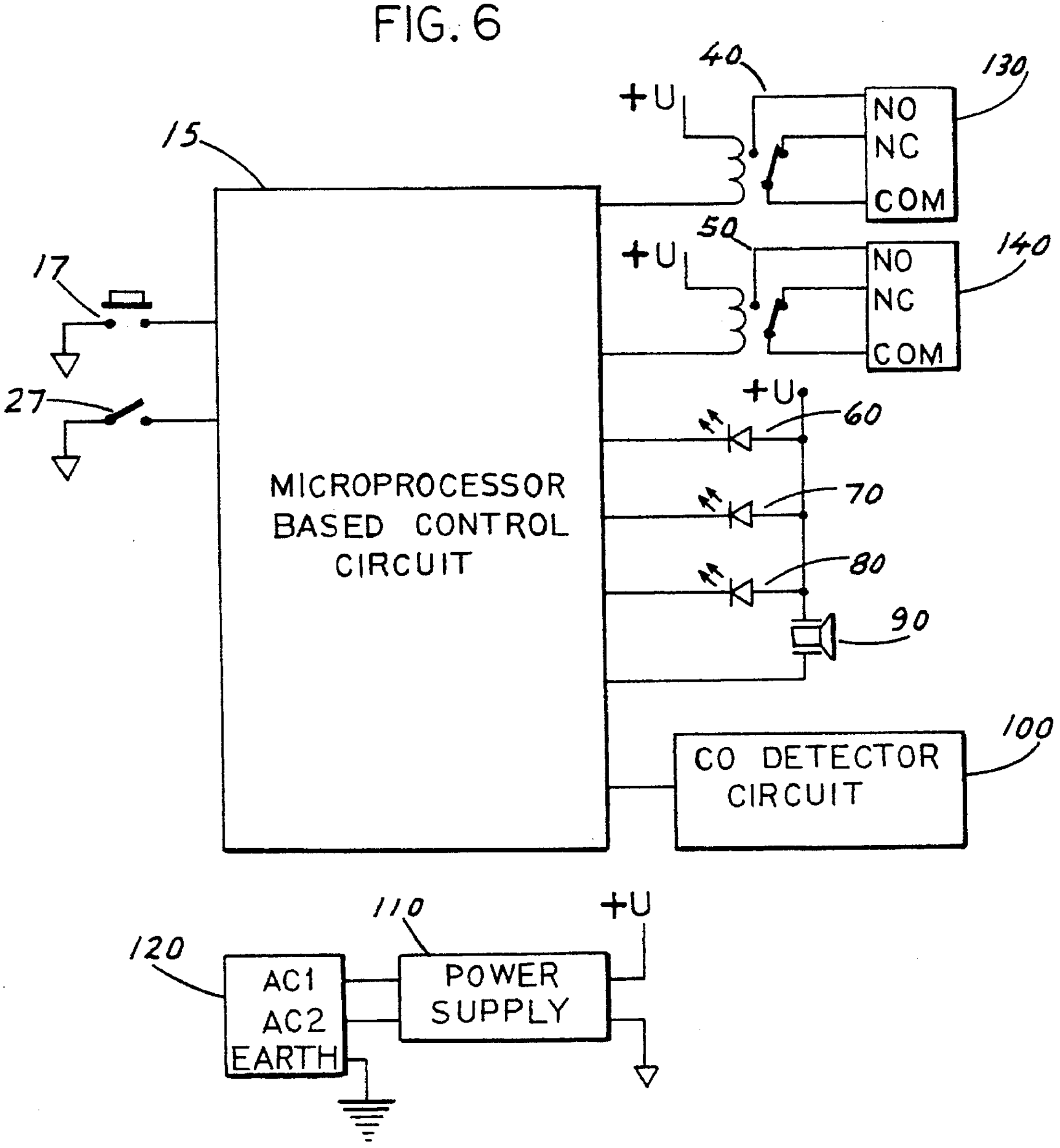
FIG. 6 illustrates an embodiment utilizing a microprocessor based control circuit.

FIG. 6 illustrates another embodiment of the invention and which utilizes a microprocessor based control circuit. The embodiment can be used to either activate or deactivate an electrical circuit in response to detection of an undesirable concentration of carbon monoxide gas. While conventional components can be used, representative components are indicated.

In the carbon monoxide gas (CO) detector and controller (15) of this embodiment, the microprocessor based control circuit (Phillips PB7C750RFPN) is comprised of a momentary push button switch (17), a single pole, single throw (SPST) switch (27), two form C relays (40 & 50), (OMRON 65L-114P-OS-DC5), three light emitting diode (LED) indicators (60, 70 & 80), (LITE-ON LTL 307E) a CO detector (100), (FIGAROT65203), an AC to DC power supply (110) (PREM SPW 502D), a buzzer (90) (PANASONIC MSR320), a microprocessor (30), and three terminal strips or blocks (120, 130 & 140)(ALLEGRO VLN 2003).

The purpose of the circuit 30 is to monitor the level of CO in the air and, in the event that the concentration of CO reaches an alarm level, to activate two sets of relay contact outputs and to sound an alarm. The contacts (40, 50) are accessible by the way of the terminal. (130 & 140). The contacts (40, 50) may be used to control a garage door opener, a furnace, a ventilator, a remote alarm device, or any number of other devices. In a form C relay, the contacts 40, 50 represent normally open (NO) or normally closed (NC) positions so that the CO detector and controller can be used to either activate or deactivate an electrical circuit as previously described. As illustrated, the contacts (40) and terminal strips (130) can be used to activate or deactivate a circuit. Through the normally open (NO) contacts, the circuit in a garage door opening system can be activated, for example, to open the garage door. Likewise, the normally closed (NC) contacts can be used to deactivate a furnace circuit in the event the CO concentration reaches a predetermined level. The contacts (50) and terminal block (140) can be used for the operation of external systems, such as a security system, siren or for the assistance of visually impaired persons, operation of warning signals such as a light or message.

When AC power is applied to the unit through the power connector (120) the power supply (110) will convert the AC power to a voltage suitable for use by the rest of the circuit, 24 volts for example. The microprocessor (30) will turn on LED (60). The microprocessor (30) will then blink the LED (60) off then back on again every 15 seconds, to indicate that power is on and that the microprocessor (30) is functional.

The CO detector circuit (100) monitors the concentration of CO in the air. When the level of CO reaches one half of the preset alarm level, as described hereinafter, the detector (100) will signal the microprocessor (30) which will then flash all three LED indicators (60, 70 & 60) simultaneously and activate the buzzer (90) for a short burst every 15 seconds. While critical exposure levels may be time dependent, 200 parts per million (PPM) for two hours or 400 PPN at any time are currently considered critical.

When the level of CO reaches the preset alarm level, the CO detector (100) will signal the microprocessor (30). The microprocessor (30) will continue to flash all three LED indicators (60, 70 & 80) simultaneously, will activate the buzzer (90) continuously, and will energize both relays (40 & 50). This state will continue until the CO detector (100) signals the microprocessor (30) that the CO level has decreased below the alarm level. At this time, the microprocessor (30) will continue to flash all three LED indicators (60, 70 & 80) simultaneously and to activate the buzzer (90) for short bursts every 30 seconds until the CO detector (100) signals that the CO level has decreased below the one half alarm level. Both relays (40 & 50) will then be de-energized so that the garage door opener or furnace, for example, can be operated normally.

Pressing and holding the push button switch (10) for 5 seconds will cause the microprocessor (30) to act as if an alarm level of CO has been detected. This allows the unit to be tested. Closing the SPST switch (20) will disable the alarm (90) and the two form C relays (40 & 50). Upon sensing the closing of switch (20), the microprocessor (30) will strobe all three LED indicators (60, 70 & 60) one after another. This strobe mode will continue as long as switch (20) remains closed. This will allow the carbon monoxide detector and controller to be deactivated in the event it malfunctions so that, for example, a furnace can be turned back on in cold weather.

If at any time the microprocessor (30) senses a fault in the detector (100), the microprocessor (30) will activate all three LED indicators (60, 70 & 80) and the buzzer (90) for a short burst every 60 seconds. This is to indicate that the unit is in need of repair, most likely a new CO sensor. The SPST switch (20) can then be closed to disable the system.

The foregoing detailed description has been provided for understanding of the invention and no unnecessary limitations should be understood therefrom, as modifications will be obvious to those skilled in the art.

What is claimed is:

1. A carbon monoxide gas detector and controller for controlling a device producing the carbon monoxide gas and for decreasing the concentration of carbon monoxide in an affected space, the controller comprising:

a detector for measuring the concentration of the gas, the detector capable of producing a signal when the carbon monoxide concentration reaches predetermined levels, a microprocessor in electrical communication with the detector for receiving the signals from the carbon monoxide detector;

means for visually or audibly indicating a first predetermined level of carbon monoxide gas said means operatively connected to the microprocessor;

a relay in electrical communication with the microprocessor and including a first normally open contact for activating the electrical power circuit of a device for decreasing the concentration of gas in an affected space and a second normally closed contact for deactivating the electrical power circuit of a device producing the gas, when the detector senses a second predetermined level of gas, said microprocessor energizing the relay when the detector senses second predetermined level of gas;

the microprocessor operative to actuate the visual or audible indicating means when it receives a signal from the detector representing the first predetermined level of gas and activating the relay when it receives a signal representing the second predetermined level of gas;

means for deactivating the detector and controller in the event of a malfunction;

the microprocessor capable of sensing a malfunction of the detector and activating visual or audible means for indicating the malfunction.

* * * * *